(12) United States Patent
Hughes et al.

(10) Patent No.: US 8,996,923 B2
(45) Date of Patent: Mar. 31, 2015

(54) APPARATUS AND METHOD TO OBTAIN INFORMATION REGARDING SUPPRESSED FAULTS

(71) Applicant: Intel Corporation, Santa Clara, CA (US)

(72) Inventors: Christopher J. Hughes, Santa Clara, CA (US); Jesus Corbal, Barcelona (ES); Mark J. Charney, Lexington, MA (US); Milind B. Girkar, Sunnyvale, CA (US); Elmoustapha Ould-Ahmed-Vall, Chandler, AZ (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/688,544

(22) Filed: Nov. 29, 2012

(65) Prior Publication Data
US 2014/0149802 A1    May 29, 2014

(51) Int. Cl.
*G06F 11/00*    (2006.01)
*G06F 11/07*    (2006.01)

(52) U.S. Cl.
CPC .......... *G06F 11/004* (2013.01); *G06F 11/0751* (2013.01)

USPC ............................................ 714/47.1; 714/48

(58) Field of Classification Search
CPC ...................................................... G06F 11/004
USPC .......................................... 714/47.1, 47.2, 48
See application file for complete search history.

(56) References Cited

U.S. PATENT DOCUMENTS

| 6,038,380 | A | * | 3/2000 | Wise et al. | 712/200 |
|---|---|---|---|---|---|
| 6,098,179 | A | * | 8/2000 | Harter, Jr. | 714/4.4 |
| 7,788,476 | B2 | * | 8/2010 | McNutt et al. | 713/1 |
| 2002/0152369 | A1 | * | 10/2002 | Wise et al. | 712/300 |
| 2005/0212974 | A1 | * | 9/2005 | Michel et al. | 348/699 |

* cited by examiner

*Primary Examiner* — Dieu-Minh Le
(74) *Attorney, Agent, or Firm* — Trop, Pruner & Hu, P.C.

(57) ABSTRACT

A processor includes an execution unit, a fault mask coupled to the execution unit, and a suppress mask coupled to the execution unit. The fault mask is to store a first plurality of bit values to indicate which elements of a multi-element vector have an associated fault generated in response to execution of an instruction on the element in the execution unit. The suppress mask is to store a second plurality of bit values to indicate which of the elements are to have an associated fault suppressed. The processor also includes counter logic to increment a counter in response to an indication of a first fault associated with the first element and received from the fault mask, and an indication of a first suppression associated with the first element and received from the suppress mask. Other embodiments are described as claimed.

20 Claims, 8 Drawing Sheets

APPARATUS AND METHOD TO OBTAIN INFORMATION REGARDING SUPPRESSED FAULTS

BACKGROUND

Many modern processors have support for vector operations. Vectors may include data grouped into elements, e.g., bits, bytes or larger elements. In processing a vector, designated elements may be eliminated from consideration by blocking a corresponding output of executing an operation on the designated elements. Each of the designated elements may have its output blocked or suppressed in a given manner. Although the output of executing an operation on a designated element may be suppressed, the operation may be still be performed on the designated element, which may result in a fault. For instance, an arithmetic fault may be generated due to an illegal operation, such as division of the designated element by zero.

Faults can have a significant impact on execution time of a program. In order to improve the execution time, analysis may be conducted to determine the origin of faults that cause delays in execution. If faults are hidden due to suppression, optimization of the code to reduce execution time becomes difficult, because detailed information is unavailable that may indicate reasons for a slowdown of the program execution.

DETAILED DESCRIPTION

A processor including a fault counter that tracks faults including suppressed faults may be implemented. The processor may include a suppress mask to indicate which elements are suppressed, a fault mask to indicate which elements produce a fault, and logic to increment a counter in response to detection of a fault associated with an element that is suppressed.

Figure 1:
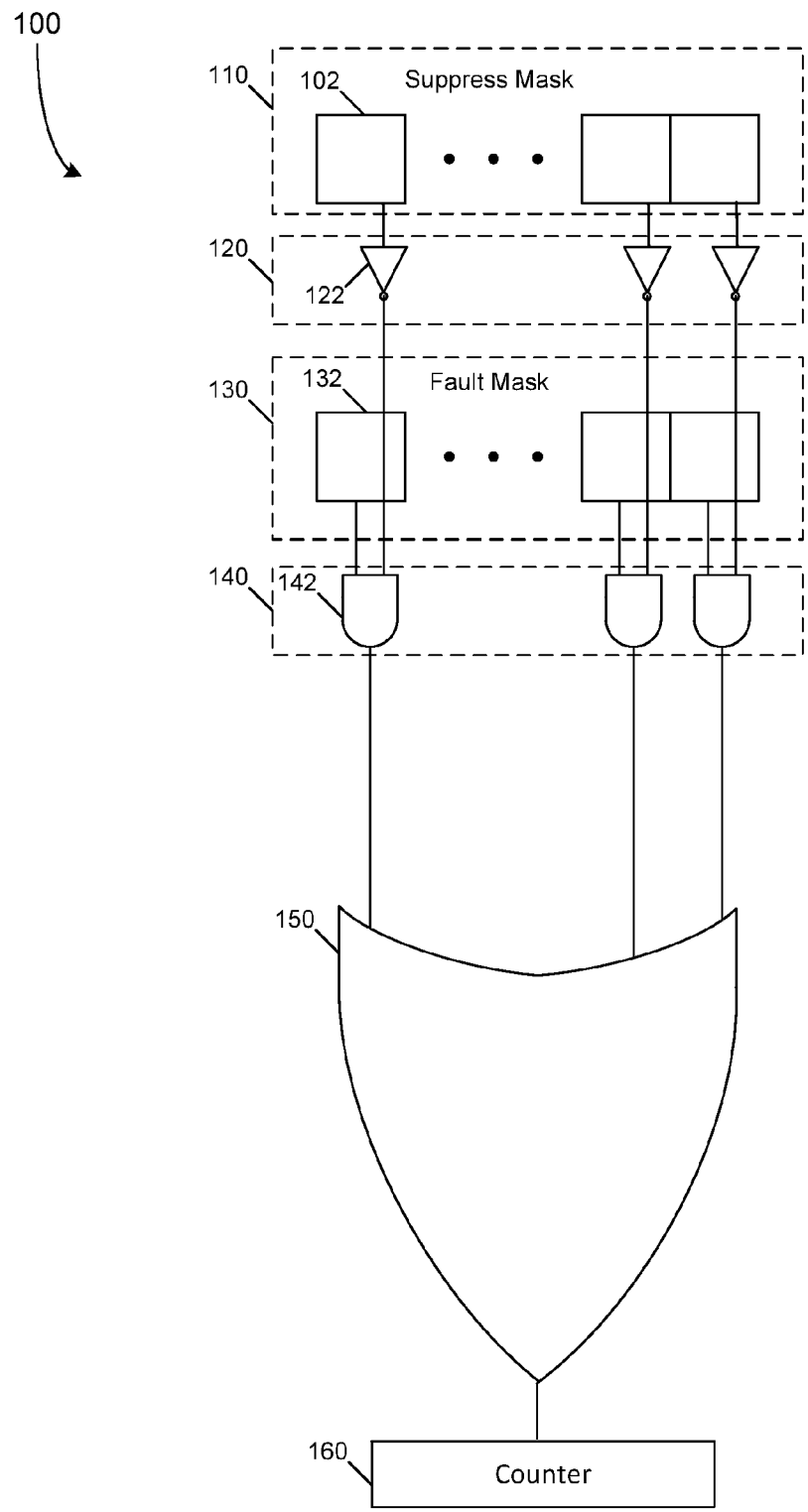
FIG. 1 is a block diagram of a suppressed fault counter to count suppressed faults in accordance with one embodiment of the present invention.

Referring to FIG. 1, shown is logic 100 to selectively increment a counter in response to one or more elements that are masked and that cause a fault to be generated as a result of executing an instruction such as an operation, a micro-operation (μop), a set of μops, a macro-instruction, or any other instruction type. The logic 100 includes a suppress mask 110, a set of inverters 120, a fault mask 130, a set of AND gates 140, and an OR gate 150.

The suppress mask 110 is a storage such as a register, and includes a storage position 102 to store a bit value. The suppress mask 110 is to store a set of bit values, and each bit value stored in the suppress mask 110 corresponds to an element of a vector being processed. The suppress mask 110 may indicate which elements of the vector are to be used for further operations. In an embodiment, a bit value of 1 stored in storage position 102 can indicate that an output of a first μop processing a first element is to be used in further operations and that associated faults, e.g., faults associated with processing the first element, are not to be suppressed. In an embodiment, a bit value of 0 stored in storage position 102 can indicate that the output of the first μop processing the first element is suppressed and that faults associated with processing the first element are to be suppressed.

The fault mask 130 is a storage, such as a register, to store an indicator for each element of the vector being processed to indicate whether the element is associated with a fault. For example, a storage position 132 of the fault mask 130 is to store a bit value to indicate whether the first element of the vector has an associated fault as a result of execution of the first μop, regardless of whether the output is suppressed.

In some embodiments, the fault mask 130 is to indicate only faults of a specific type, e.g., only general protection faults, or only alignment check faults, or only page faults, or only another specific type of fault. In one embodiment, the fault mask 130 is to indicate only faults of a group of fault types, e.g., only general protection faults and alignment check faults.

In operation, a count of suppressed faults may be determined e.g., upon retirement of each μop, or at another point during processing. Each bit value stored in the suppress mask 110 may be input to a corresponding inverter of a set of inverters 120. For example, a value of 0 in storage position 102 of the suppress mask 110, indicating that a write of the output is suppressed, results in a 1 output from the inverter 122. A fault associated with the first element is indicated by a 1 in the storage position 132 of the fault mask 130. The output of the inverter 122 and the bit value stored in the storage position 132 may be input to AND gate 142 of the set of AND gates 140. In an example, the first element is suppressed (0 in the storage element 102) and the first element also has an associated fault (1 in the storage position 132). The inputs to the first AND gate 142 result in an output of the first AND gate 142 having an output value of 1 that is subsequently input to the OR gate 150. Because at least one of the inputs of the OR gate 150 has a value of 1, the OR gate 150 outputs a value of 1, causing an increment of the counter 160. In the embodiment of FIG. 1, any combination of elements that are suppressed and are also associated with a fault associated with processing by a single μop results in a single increment of the counter. That is, whether only one element that is suppressed has an associated fault, or each of a plurality of suppressed elements has a respective suppressed fault, the counter is incremented by a single count for the μop that is most recently executed on the vector.

While shown with this high level in the embodiment of FIG. 1, understand the scope of the present invention is not limited in this regard. For example, in other embodiments, additional logic may be included to enable each of the outputs of the AND gates 140 to increment to the counter 160, so that the counter 160 indicates, for each μop, all instances of faults that are suppressed.

In other embodiments, the fault mask 130 is to indicate only faults of a specific type, e.g., only general protection faults, or only alignment check faults, or only page faults, or only another specific type of fault. For example, in one embodiment, the counter is to total, for each μop applied to every element of the vector, the instances of alignment check faults that are suppressed, and due to the specificity of the fault mask 130 the counter 160 is not incremented in response to other types of faults. In another embodiment, due to the specificity of the fault mask 130 the counter 160 is to count only faults of a subset of fault types, e.g., only general protection faults and alignment check faults.

Figure 2:
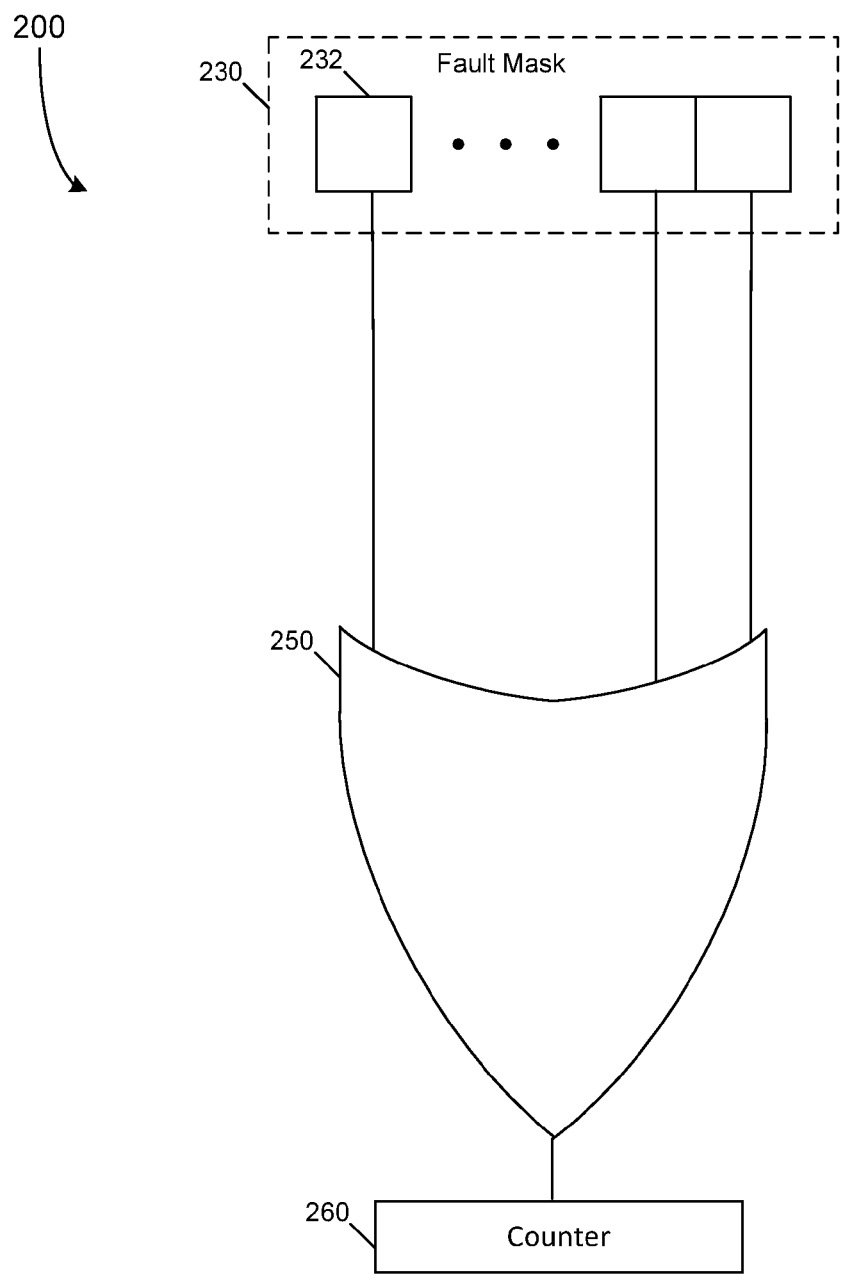
FIG. 2 is a block diagram of another suppressed fault counter to count faults in accordance with one embodiment of the present invention.

Referring now to FIG. 2, shown is a block diagram 200 to selectively increment a counter in response to one or more elements of a vector that cause a fault to be generated (including a suppressed fault) as a result of executing an instruction, such as a micro-operation (μop), on the vector. The logic 200 includes a fault mask 230 and an OR gate 250. The fault mask 230 is to store, for each element of the vector, an indicator as to whether the element is associated with a fault, e.g., storage position 232 is to store an indicator as to whether the first element has an associated fault as a result of being processed by an instruction such as a first μop (or e.g., an operation). In some embodiments, the fault mask 230 is to indicate only faults of a specific type, e.g., only general protection faults, or only alignment check faults, or only page faults, or only faults of another specific type. In some embodiments, the fault mask 230 is to indicate only faults within a group of fault types, e.g., only general protection and alignment check faults. The OR gate 250 is to receive the bit values stored in each storage position of the fault mask 230 and to output a value of 1 in response to at least one value of 1 input to the OR gate 250. The output of the OR gate 250 is input to a counter 260 that is incremented in response to receipt of a 1 from the OR gate 250, and the counter 260 is not incremented in response to receipt of a 0 from the OR gate 250.

In operation, on retirement of an instruction, such as the first μop, or in response to another trigger event, a fault associated with the first element of a vector is indicated by a 1 in the storage position 232 of the fault mask 230. For example, the first element has an associated fault (a value of 1 in storage position 232). The bit values stored in the fault mask 230 are input to the OR gate 250. If one or more bit values stored in the fault mask 230 is 1, the OR gate 250 outputs a value of 1, causing the counter 260 to be incremented. If all bit values stored in the fault mask 230 are 0, the OR gate 250 outputs a value of 0, and the counter 260 is not incremented. In this embodiment, any combination of elements that have an associated fault (including suppressed faults) when executed on by a single μop, results in a single increment of the counter 260. That is, whether only one element has an associated fault or each of a plurality of elements has an associated fault, the counter is incremented by only a single count for the μop most recently executed on the vector. While shown with this high level in the embodiment of FIG. 2, understand the scope of the present invention is not limited in this regard.

In another embodiment (not shown), additional logic may be included to enable each of the bit values of the fault mask 230 to increment to the counter 260, so that the counter 260 totals, for each μop, all instances of faults, including suppressed faults, associated with elements of the vector being processed.

Figure 3:
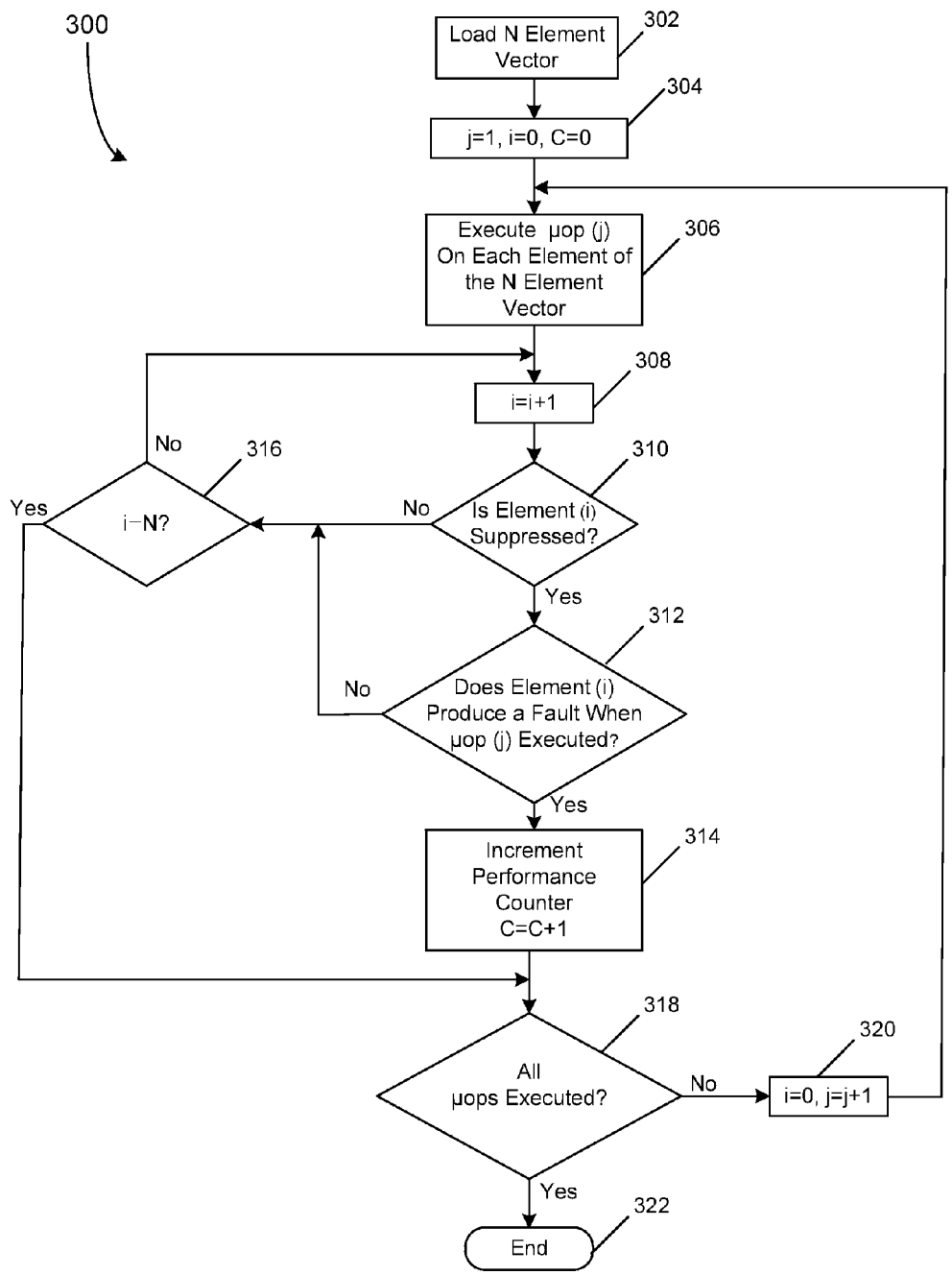
FIG. 3 is a flow diagram of a method for counting masked faults in accordance with one embodiment of the present invention.

Referring now to FIG. 3, shown is a method of counting suppressed faults, according to an embodiment of the invention. The method starts with block 302, where a vector having N elements is loaded to a processor. Moving to block 304, an index j is set to a value of 1, an index i is set to an initial value of 0, and a counter is initialized to a count C=0. Advancing to block 306, an operation (e.g., an instruction) such as a μop(j) is executed on the vector by processing each of the N elements of the vector. Continuing to block 308, the index i is incremented to i+1. Proceeding to decision diamond 310, it can be determined whether the $i^{th}$ element is suppressed, e.g., via a suppress mask, to prevent execution by further operations and if so, control passes to diamond 312, where it can be determined whether the $i^{th}$ element has produced a fault when executed on by the $j^{th}$ micro-op, μop(j). If the $i^{th}$ element has produced a fault when executed on by μop(j), advancing to block 314 the counter is incremented (C=C+1), reflecting a suppressed fault. Returning to diamond 310, if it is determined that the $i^{th}$ element is not suppressed to prevent further operations (e.g., via a suppress mask), control passes to diamond 316. Also, if it is determined at 312 that the $i^{th}$ element did not produce a fault when the μop(j) executed on the $i^{th}$ element, control passes to diamond 316. At diamond 316 it can be determined whether all of the N elements have been considered, e.g., is i=N? If the index i is not equal to N, control returns to block 308 and the index i is incremented, enabling the next element in the vector to be examined, at diamond 310, as to whether the element is suppressed, and if so, whether the suppressed element causes a fault when operated on by μop(j), at diamond 312.

Again at block 314, the counter is incremented and control passes to diamond 318 where it can be determined whether all μop(j) of an instruction have executed on the vector. If not, moving to block 320 the μop index j is incremented by 1 and the element index i is reset to 0, after which control passes to block 306 and the next μop is executed on each element of the vector. For each μop(j), the counter is incremented by 1 if at least one fault is attributed to the elements of the vector, e.g., when one (or more) suppressed fault is detected. In this embodiment, the counter C is incremented only once regardless of how many elements of the vector have an associated fault when executed upon by μop(j). If all μops have been executed, the method ends at block 322.

The method of FIG. 3 may be triggered, e.g., by retirement of each μop, or by satisfaction of another condition. The method of FIG. 3 can be performed by hardware, software, firmware, or combinations thereof. While shown at a high level in the embodiment of FIG. 3, it is to be understood that the scope of the present invention is not so limited.

Figure 4:
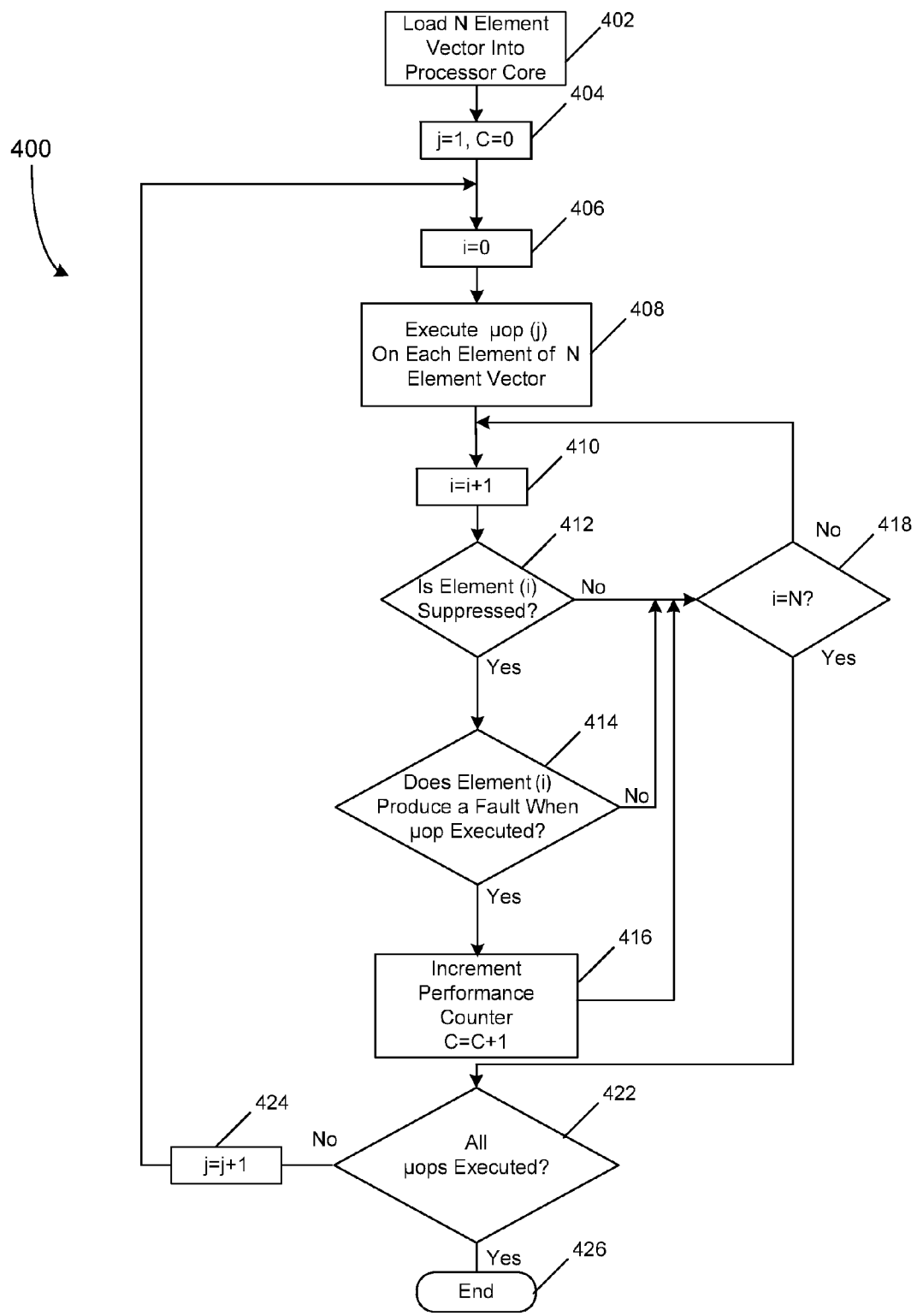
FIG. 4 is a flow diagram of a method for counting masked faults in accordance with another embodiment of the present invention.

Referring now to FIG. 4, shown is a method of counting suppressed faults, according to an embodiment of the invention. The method starts with block 402, where a vector having N elements is loaded to a processor. Moving to block 404, micro-op index j is initialized to 1 and counter C is initialized to C=0. Continuing to block 406, the vector element index i is initialized to 0. Advancing to block 408, an operation (e.g., an instruction) such as a μop(j) executes on the vector by processing each of the N elements of the vector.

Continuing to block 410, the element index i is incremented to i+1. Proceeding to decision diamond 412, it can be determined whether the $i^{th}$ element is suppressed (e.g., via a suppress mask) to prevent further operations, and if so, control passes to diamond 414, where it can be determined whether the $i^{th}$ element has produced a fault when operated on by the $j^{th}$ micro-op, μop(j). If the $i^{th}$ element has produced a suppressed fault when operated on by μop(j), advancing to block 416 the counter C is incremented (C=C+1). Returning to diamond 412, if it is determined that the $i^{th}$ element is not suppressed, control passes to diamond 418. Also, if it is determined that the $i^{th}$ element did not produce a fault when μop(j) executed on the $i^{th}$ element, control passes to diamond 418, where it can be determined whether each of the N elements has been considered, e.g., i=N? If the index i is not equal to N, control returns to block 410 and the index i is incremented, enabling the next element in the vector to be examined as to whether the element is suppressed and if so, whether the element produces a fault when μop(j) executes on the $i^{th}$ element.

Returning to block 416, after the counter C is incremented, control passes to diamond 418. If not all of the elements of the vector have been considered, returning to block 410, the index i is incremented and the next element of the vector is considered to determine whether the element generates an associated suppressed fault.

At diamond 418, if all N elements of the vector have been considered, e.g., i=N, control passes to diamond 422, where it can be determined whether all μop(j) of an instruction have been executed. If not, moving to block 424 the μop index j is incremented by 1. Returning to block 406 the element index i is reset to 0, and moving to block 408 the next μop(j) is executed on each element of the vector. If, at diamond 424, all μops have been executed, the method ends at block 426.

In contrast to the method of FIG. 3, in the method of FIG. 4 for a given μop, each of the elements can cause the counter C to be incremented so that the counter C can be incremented between 0 and N by considering all of the N elements of the vector.

The method of FIG. 4 may be triggered, e.g., by retirement of each μop, or by satisfaction of another condition. The method of FIG. 4 can be performed by hardware, software, firmware, or combinations thereof. While shown at a high level in the embodiment of FIG. 4, it is to be understood that the scope of the present invention is not so limited.

Figure 5:
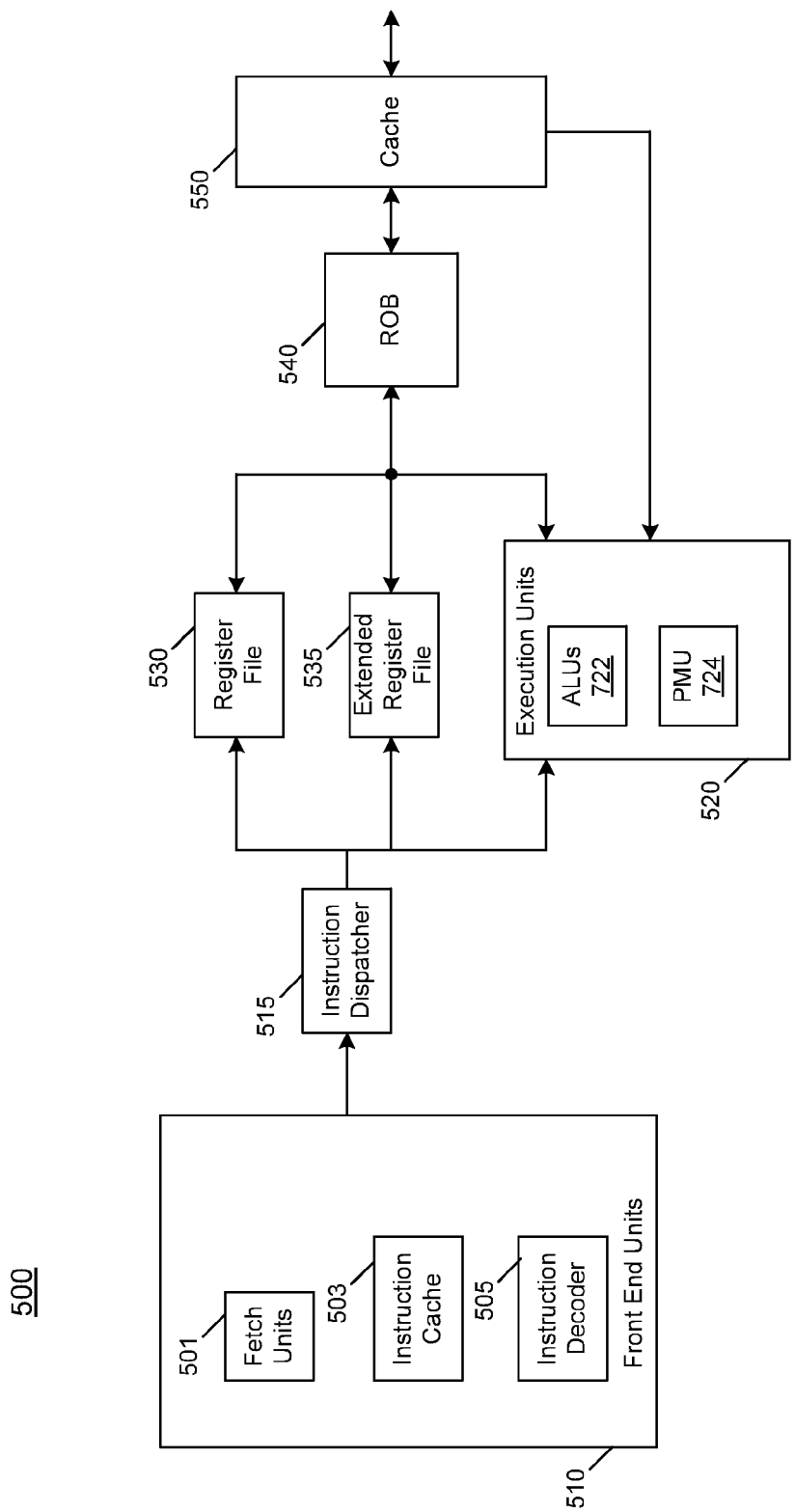
FIG. 5 is a block diagram of a processor core in accordance with one embodiment of the present invention.

Referring now to FIG. 5, shown is a block diagram of a processor core in accordance with one embodiment of the present invention. As shown in FIG. 5, processor core 500 may be a multi-stage pipelined out-of-order processor. Processor core 500 is shown with a relatively simplified view in FIG. 5. As shown in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an instruction dispatcher 515 which can be implemented as out-of-order logic in out-of-order implementations to receive the micro-instructions and prepare them for execution. More specifically instruction dispatcher 515 may include various buffers to allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522. In addition, execution units may further include a performance monitoring unit (PMU) 524. In various embodiments, PMU 524 may be used to control obtaining of various information, e.g., profiling counters, fault counters as described herein, and so forth, including suppressed fault counters such as those described with respect to FIGS. 1 and 2. In particular implementations here, PMU 524 or other such logic may be used to provide processor utilization information.

Results of execution in the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement. For example, ROB 540 may include fault counters including suppressed fault counters (e.g., each suppressed fault counter including a suppress mask and a fault mask) as described herein, which may be triggered upon retirement of an instruction.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. While shown with this high level in the embodiment of FIG. 5, understand the scope of the present invention is not limited in this regard.

Figure 6:
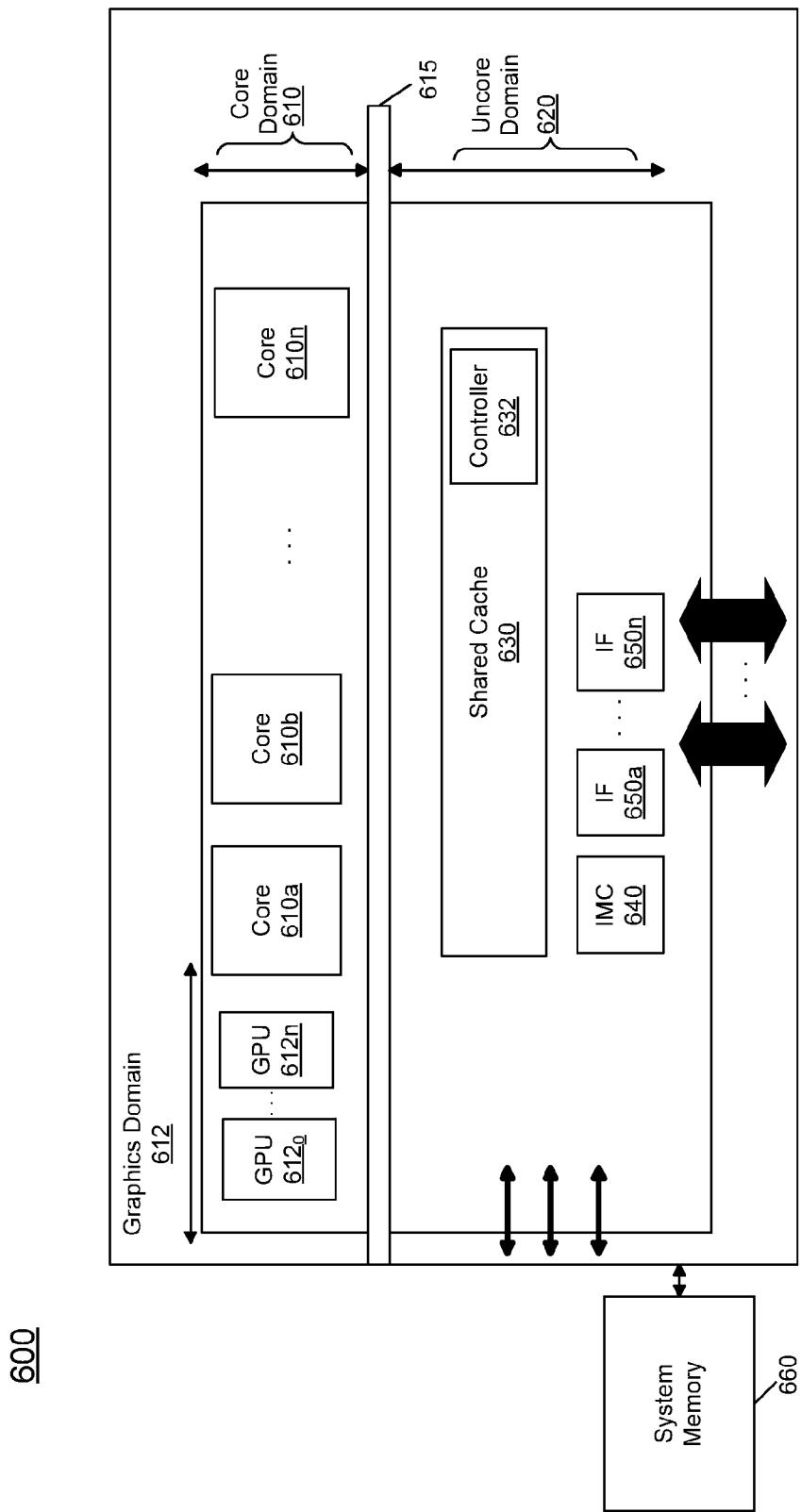
FIG. 6 is a block diagram of a processor in accordance with an embodiment of the present invention.

Referring now to FIG. 6, shown is a block diagram of a processor in accordance with an embodiment of the present invention. As shown in FIG. 6, processor 600 may be a multicore processor including a plurality of cores 610a-610n in a core domain 610. One or more of the cores may include a fault counter that determines a count of faults including suppressed faults, as described in FIGS. 1 and 2. The cores may be coupled via an interconnect 615 to a system agent or uncore 620 that includes various components. As seen, the uncore 620 may include a shared cache 630 which may be a last level cache and includes a cache controller 632. In addition, the uncore may include an integrated memory controller 640 and various interfaces 650.

With further reference to FIG. 6, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 6, the scope of the present invention is not limited in this regard.

Figure 7:
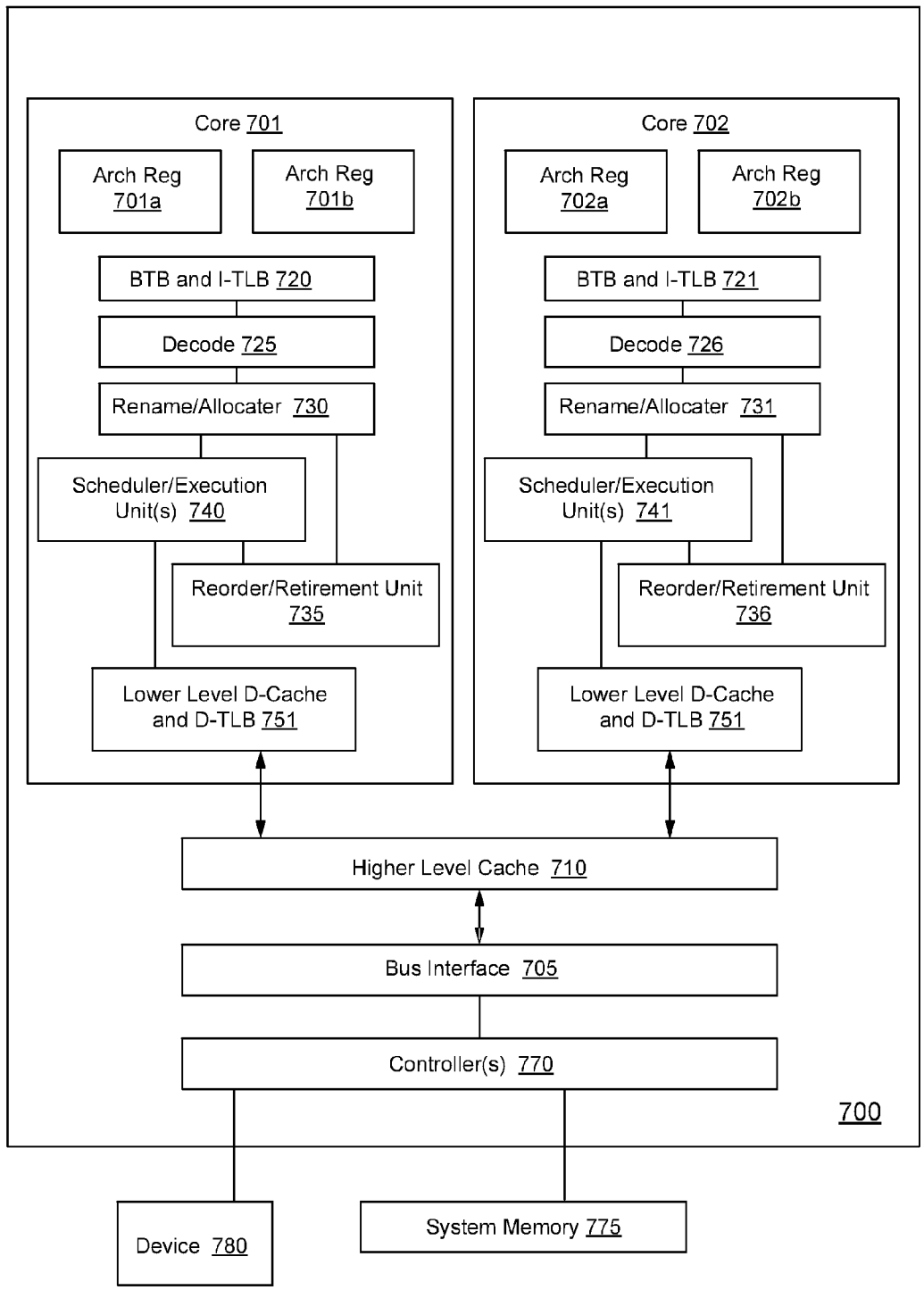
FIG. 7 is a block diagram of an embodiment of a processor including multiple cores.

Referring to FIG. 7, an embodiment of a processor including multiple cores is illustrated. Processor 700 includes any processor or processing device, such as a microprocessor, an embedded processor, a digital signal processor (DSP), a network processor, a handheld processor, an application processor, a co-processor, a system on a chip (SOC), or other device to execute code. Processor 700, in one embodiment, includes at least two cores—cores 701 and 702, which may include asymmetric cores or symmetric cores (the illustrated embodiment). However, processor 700 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 700, as illustrated in FIG. 7, includes two cores, cores 701 and 702. Here, cores 701 and 702 are considered symmetric cores, i.e., cores with the same configurations, functional units, and/or logic. In another embodiment, core 701 includes an out-of-order processor core, while core 702 includes an in-order processor core. However, cores 701 and 702 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 701 are described in further detail below, as the units in core 702 operate in a similar manner.

As depicted, core 701 includes two hardware threads 701a and 701b, which may also be referred to as hardware thread slots 701a and 701b. Therefore, software entities, such as an operating system, in one embodiment potentially view processor 700 as four separate processors, i.e., four logical processors or processing elements capable of executing four software threads concurrently. As alluded to above, a first thread is associated with architecture state registers 701a, a second thread is associated with architecture state registers 701b, a third thread may be associated with architecture state registers 702a, and a fourth thread may be associated with architecture state registers 702b. Here, each of the architecture state registers (701a, 701b, 702a, and 702b) may be referred to as processing elements, thread slots, or thread units, as described above. As illustrated, architecture state registers 701a are replicated in architecture state registers 701b, so individual architecture states/contexts are capable of being stored for logical processor 701a and logical processor 701b. In core 701, other smaller resources, such as instruction pointers and renaming logic in allocator and renamer block 730 may also be replicated for threads 701a and 701b. Some resources, such as re-order buffers in reorder/retirement unit 735, ILTB 720, load/store buffers, and queues may be shared through partitioning. Other resources, such as general purpose internal registers, page-table base register(s), low-level data-cache and data-TLB 715, execution unit(s) 740, and portions of out-of-order unit 735 are potentially fully shared.

Processor 700 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 701 includes a simplified, representative out-of-order (OOO) processor core. But an in-order processor may be utilized in different embodiments. The OOO core includes a branch target buffer 720 to predict branches to be executed/taken and an instruction-translation buffer (I-TLB) 720 to store address translation entries for instructions.

Core 701 further includes decode module 725 coupled to fetch unit 720 to decode fetched elements. Fetch logic, in one embodiment, includes individual sequencers associated with thread slots 701a, 701b, respectively. Usually core 701 is associated with a first ISA, which defines/specifies instructions executable on processor 700. Often machine code instructions that are part of the first ISA include a portion of the instruction (referred to as an opcode), which references/specifies an instruction or operation to be performed. Decode logic 725 includes circuitry that recognizes these instructions from their opcodes and passes the decoded instructions on in the pipeline for processing as defined by the first ISA. For example, decoders 725, in one embodiment, include logic designed or adapted to recognize specific instructions, such as transactional instruction. As a result of the recognition by decoders 725, the architecture or core 701 takes specific, predefined actions to perform tasks associated with the appropriate instruction. It is important to note that any of the tasks, blocks, operations, and methods described herein may be performed in response to a single or multiple instructions, some of which may be new or old instructions.

In one example, allocator and renamer block 730 includes an allocator to reserve resources, such as register files to store instruction processing results. However, threads 701a and 701b are potentially capable of out-of-order execution, where allocator and renamer block 730 also reserves other resources, such as reorder buffers to track instruction results. Unit 730 may also include a register renamer to rename program/instruction reference registers to other registers internal to processor 700. Reorder/retirement unit 735 includes components, such as the reorder buffers mentioned above, load buffers, and store buffers, to support out-of-order execution and later in-order retirement of instructions executed out-of-order.

Scheduler and execution unit(s) block 740, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

One or both of cores 701 and 702 may include a fault counter (not shown), such as the suppressed fault counter of FIG. 1 or FIG. 2, in accordance with an embodiment of the present invention. The fault counter may provide a count of faults including suppressed faults. Alternatively, the fault counter may provide a count that represents only suppressed faults.

Lower level data cache and data translation buffer (D-TLB) 750 are coupled to execution unit(s) 740. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 701 and 702 share access to higher-level or further-out cache 710, which is to cache recently fetched elements. Note that higher-level or further-out refers to cache levels increasing or getting further away from the execution unit(s). In one embodiment, higher-level cache 710 is a last-level data cache—last cache in the memory hierarchy on processor 700—such as a second or third level data cache. However, higher level cache 710 is not so limited, as it may be associated with or includes an instruction cache. A trace cache—a type of instruction cache—instead may be coupled after decoder 725 to store recently decoded traces.

In the depicted configuration, processor 700 also includes bus interface module 705. Historically, controller 770 has been included in a computing system external to processor 700. In this scenario, bus interface 705 is to communicate with devices external to processor 700, such as system memory 775, a chipset (often including a memory controller hub to connect to memory 775 and an I/O controller hub to connect peripheral devices), a memory controller hub, a northbridge, or other integrated circuit. And in this scenario, bus 705 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 775 may be dedicated to processor 700 or shared with other devices in a system. Common examples of types of memory 775 include DRAM, SRAM, non-volatile memory (NV memory), and other known storage devices. Note that device 780 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 770 is illustrated as part of processor 700. Recently, as more logic and devices are being integrated on a single die, such as SOC, each of these devices may be incorporated on processor 700. For example in one embodiment, memory controller hub 770 is on the same package and/or die with processor 700. Here, a portion of the core (an on-core portion) includes one or more controller(s) 770 for interfacing with other devices such as memory 775 or a graphics device 780. The configuration including an interconnect and controllers for interfacing with such devices is often referred to as an on-core (or un-core configuration). As an example, bus interface 705 includes a ring interconnect with a memory controller for interfacing with memory 775 and a graphics controller for interfacing with graphics processor 780. Yet, in the SOC environment, even more devices, such as the network interface, co-processors, memory 775, graphics processor 780, and any other known computer devices/interface may be integrated on a single die or integrated circuit to provide small form factor with high functionality and low power consumption.

Figure 8:
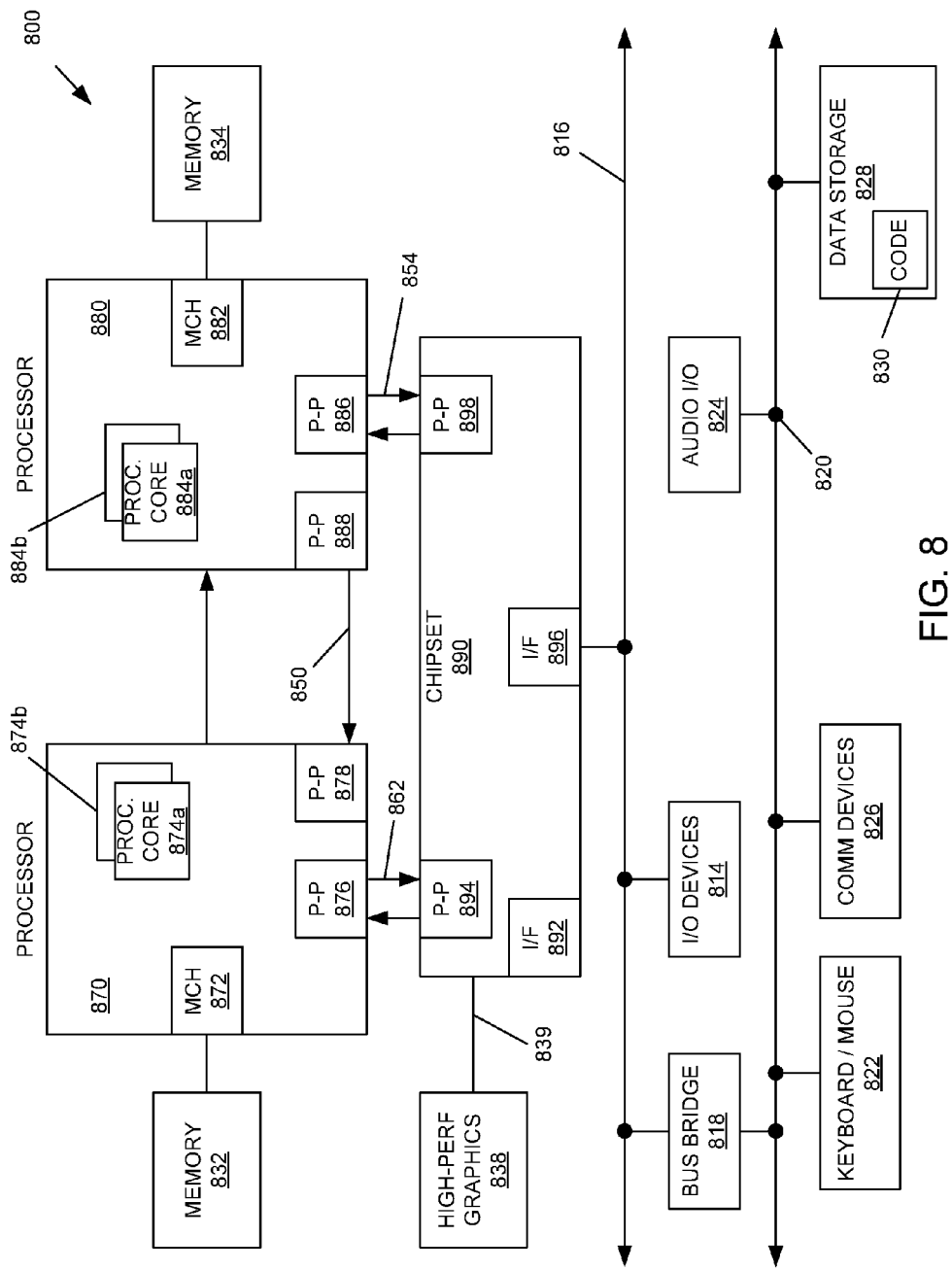
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. One or more of the processors can include a corresponding fault counter, such as the suppressed fault counter of FIG. 1 or FIG. 2, to generate fault information as described herein, for communication to e.g., an external entity. For example, the fault information may be provided for access by e.g., a programmer, who may utilize the information to modify the program of instructions for greater execution efficiency.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
an execution unit to execute an instruction;
a fault mask, coupled to the execution unit, to store a plurality of fault indicators, each fault indicator associated with a corresponding element of a multi-element vector, wherein a fault indicator has a first fault value when execution of the instruction by the execution unit on the corresponding element is to produce a corresponding fault, otherwise the fault indicator has a second fault value;
a suppress mask to store a plurality of suppress indicators, each suppress indicator corresponding to one of the elements of the multi-element vector, wherein a fault is to be suppressed when the suppress indicator associated with the corresponding element has a first suppress value, and the fault is to be unsuppressed when the suppress indicator associated with the corresponding element has a second suppress value; and
counter logic to increment a counter in response to receipt of the fault indicator that is associated with a particular element and that has the first fault value from the fault mask when the suppress indicator that is associated with the particular element and that has the first suppress value is received from the suppress mask.

2. The processor of claim 1, wherein the fault mask is to indicate one of only page faults, only general protection faults, and only alignment check faults.

3. The processor of claim 1, wherein each fault indicated by the fault mask is one of a general protection fault and an alignment check fault.

4. The processor of claim 1, further comprising a performance monitoring unit to control access to the counter.

5. The processor of claim 1, wherein the counter logic is to increment the counter in response to each fault indicator that has the first fault value and that is received from the fault mask when the corresponding suppress indicator has the first suppress value and is received from the suppress mask.

6. The processor of claim 1, wherein the counter is to be incremented further conditioned on retirement of the instruction.

7. The processor of claim 1, wherein the counter logic includes:
a set of AND gates, each AND gate to receive a corresponding element first input that comprises an inverted output of the suppress mask, and a corresponding element second input from the fault mask; and
an OR gate to receive a respective output of each AND gate, wherein an OR gate output of the OR gate is to indicate whether to increment the counter based on the received output of one or more of the AND gates.

8. A system comprising:
a processor including a core that includes:
a fault mask comprising a plurality of storage positions, each storage position corresponding to an element of a multi-element vector, the fault mask to indicate each of the elements that are to cause a respective fault including suppressed faults, wherein each fault is to be generated in response to execution of an instruction on the associated element; and
counter logic coupled to the fault mask, the counter logic to increment a counter in response to an indication from the fault mask that at least one fault is to be generated by one of the elements upon execution by the instruction; and
a dynamic random access memory (DRAM) coupled to the processor.

9. The system of claim 8, wherein the fault mask is to indicate one of only page faults, indicate only general protection faults, or only alignment check faults.

10. The system of claim 8, wherein each associated fault indicated by the fault mask is one of a general protection fault and an alignment check fault.

11. The system of claim 8, wherein the counter is to be incremented conditioned on retirement of the instruction.

12. The system of claim 8, wherein the counter is to be incremented only when the respective fault is to be suppressed.

13. The system of claim 12, wherein the core includes a suppress mask to store a second plurality of bit values that indicate which of the elements of the multi-element vector are to be suppressed.

14. The system of claim 13, wherein the counter logic includes:
a set of AND gates, each AND gate to receive a corresponding element first input that is an inverted output of a corresponding bit value of the suppress mask, and each AND gate to receive a corresponding element second input that is received from a corresponding bit value of the fault mask; and
an OR gate to receive a respective output of each AND gate, wherein an OR gate output of the OR gate is to indicate whether to increment the counter based on the received output of at least one of the AND gates.

15. A method comprising:
executing an operation on a plurality of elements of a vector in a vector execution unit of a processor;
incrementing a counter in response to detection of a fault associated with execution of the operation on an element of the vector when the fault is to be suppressed; and
communicating a value of the counter to a performance monitoring unit.

16. The method of claim 15, further comprising limiting incrementing associated with execution of the operation to a single increment of the counter when the execution of the operation on the plurality of elements is to produce more than one fault to be suppressed.

17. The method of claim 15, wherein the counter is to be incremented only when the fault is a page fault.

18. The method of claim 15, wherein when the counter is to be incremented, upon retirement of the operation the counter is incremented.

19. The method of claim 15, wherein the fault is one of a general protection fault and an alignment check fault.

20. The method of claim 15, further comprising determining whether the fault is to be suppressed from a suppress mask coupled to the processor.

* * * * *